US007688905B1

(12) United States Patent
Yucek et al.

(10) Patent No.: US 7,688,905 B1
(45) Date of Patent: Mar. 30, 2010

(54) NOISE PLUS INTERFERENCE POWER ESTIMATION METHOD FOR OFDM SYSTEMS

(75) Inventors: Tevfik Yucek, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 838 days.

(21) Appl. No.: 11/428,473

(22) Filed: Jul. 3, 2006

Related U.S. Application Data

(60) Provisional application No. 60/696,370, filed on Jul. 1, 2005.

(51) Int. Cl.
*H04K 1/10* (2006.01)
(52) U.S. Cl. .................. 375/260; 375/254; 375/346; 455/63.1; 455/278.1; 455/296
(58) Field of Classification Search .............. 375/260, 375/316; 455/63.1, 278.1, 296
See application file for complete search history.

(56) References Cited

U.S. PATENT DOCUMENTS 6,456,653 B1   9/2002   Sayeed

2005/0105657 A1*  5/2005  Kroeger et al. ............. 375/347
2005/0180517 A1*  8/2005  Abe ........................... 375/260

* cited by examiner

*Primary Examiner*—Mohammad H Ghayour
*Assistant Examiner*—Leila Malek
(74) *Attorney, Agent, or Firm*—Molly L. Sauter; Smith & Hopen, P.A.

(57) ABSTRACT

In accordance with the present invention, a method and apparatus for estimating the noise and interference over the transmission band for OFDM systems are provided. Noise variance and signal-to-noise ratio (SNR) are important parameters for adaptive orthogonal frequency division multiplexing (OFDM) systems since they serve as a standard measure of signal quality. Conventional algorithms assume that the noise statistics remain constant over the OFDM frequency band, and thereby average the instantaneous noise samples to get a single estimate. In reality, noise is often made up of white Gaussian noise along with correlated colored noise that affects the OFDM spectrum unevenly. Provided is an adaptive windowing technique to estimate the noise power that takes into account the variation of the noise statistics across the OFDM sub-carrier index as well as across OFDM symbols. The proposed method provides many local estimates, allowing tracking of the variation of the noise statistics in frequency and time. A mean-squared-error (MSE) expression in order to choose the optimal window dimensions for averaging in time and frequency is derived.

20 Claims, 3 Drawing Sheets

NOISE PLUS INTERFERENCE POWER ESTIMATION METHOD FOR OFDM SYSTEMS

CROSS REFERENCE TO RELATED APPLICATIONS

This application claims priority to currently pending U.S. Provisional Patent Application 60/696,370, entitled, "Noise Plus Interference Power Estimation Method for OFDM Systems", filed Jul. 1, 2005, the contents of which are herein incorporated by reference.

FIELD OF INVENTION

This invention relates to a method and apparatus for estimating the noise and interference power over the transmission band for OFDM systems.

BACKGROUND OF THE INVENTION

Orthogonal Frequency Division Multiplexing (OFDM) is a multi-carrier modulation scheme in which the wide transmission spectrum is divided into narrower bands and data is transmitted in parallel on these narrow bands. Therefore, symbol period is increased by the number of sub-carriers, decreasing the effect of inter-symbol interference (ISI). The remaining ISI effect is eliminated by cyclically extending the signal. OFDM provides effective solution to high data-rate transmission by its robustness against multi-path fading. Parallel with the possible data rates, the transmission bandwidth of OFDM systems is also large. UWB-OFDM and IEEE 802.16 based wireless metropolitan area network (WMAN) systems are examples of OFDM systems with large bandwidths. Because of these large bandwidths, noise can not be assumed to be white with flat spectrum across subcarriers.

The signal-to-noise ratio (SNR) is broadly defined as the ratio of the desired signal power to the noise power and has been accepted as a standard measure of signal quality. Adaptive system design requires the estimate of SNR in order to modify the transmission parameters to make efficient use of system resources. Poor channel conditions, reflected by low SNR values, require that the transmitter modify transmission parameters such as coding rate, modulation mode etc. to compensate for the channel and to satisfy certain application dependent constraints such as constant bit error rate (BER) and throughput. Dynamic system parameter adaptation requires a real-time noise power estimator for continuous channel quality monitoring and corresponding compensation in order to maximize resource utilization. SNR knowledge also provides information about the channel quality which can be used by handoff algorithms, power control, channel estimation through interpolation, and optimal soft information generation for high performance decoding algorithms.

The SNR can be estimated using regularly transmitted training sequences, pilot data or data symbols (blind estimation.). In conventional SNR estimation techniques, the noise is usually assumed to be white and an SNR value is calculated for all subcarriers. In addition, in the prior art it is known to remove this assumption by calculating SNR values for each subcarrier. However, the correlation of the noise variance across subcarriers is not used since noise variance is calculated for each subcarrier separately.

White noise is rarely the case in practical wireless communication systems where the noise is dominated by interferences which are often colored in nature. This is more pronounced in OFDM systems where the bandwidth is large and the noise power is not the same over all the sub-carriers. Color of the noise is defined as the variation of its power spectral density in frequency domain. This variation of spectral content affects certain sub-carriers more than the others. Therefore, an averaged noise estimate is not the optimal technique to use.

SUMMARY OF INVENTION

The present invention provides a method and apparatus for estimating the noise and interference over the transmission band for OFDM systems. In this methodology the assumption of the noise to be white is removed and variation of the noise power across OFDM sub-carriers as well as across OFDM symbols is allowed. The noise variances at each subcarrier is estimated using a two dimensional sliding window. These estimates are specifically useful for adaptive modulation, and optimal soft value calculation for improving channel decoder performance. Moreover, it can be used to detect and avoid narrowband interference.

The methodology may be used in communication systems based on multi-carrier transmission. Some examples are wireless local area networks (WLAN), wireless metropolitan networks (WMAN) and OFDM-based ultrawideband communication systems. The developed technology provides better signal quality estimation and it allows adaptation of different parameters in wireless systems. Hence, higher throughputs and lower error rates may be achieved using the developed technology in accordance with the present invention.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
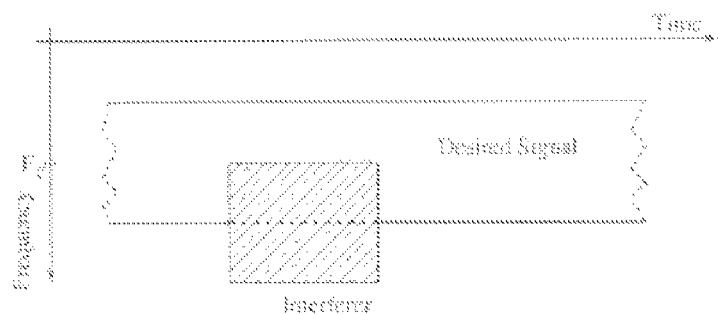
FIG. 1 is an illustration of non-stationary interference.

A method and apparatus for estimating the noise and interference over the transmission band for OFDM systems are provided. Noise variance and signal-to-noise ratio (SNR) are important parameters for adaptive orthogonal frequency division multiplexing (OFDM) systems since they serve as a standard measure of signal quality. Conventional algorithms assume that the noise statistics remain constant over the OFDM frequency band, and thereby average the instantaneous noise samples to get a single estimate. In reality, noise is often made up of white Gaussian noise along with correlated colored noise that affects the OFDM spectrum unevenly. Provided is an adaptive windowing technique to estimate the noise power that takes into account the variation of the noise statistics across the OFDM sub-carrier index as well as across OFDM symbols. The proposed method provides many local estimates, allowing tracking of the variation of the noise statistics in frequency and time. A mean-squared-error (MSE) expression in order to choose the optimal window dimensions for averaging in time and frequency is derived. Evaluation of the performance with computer simulations shows that the proposed method tracks the local statistics of the noise more efficiently than conventional methods.

OFDM converts serial data stream into parallel blocks of size N and modulates these blocks using inverse fast Fourier transform (IFFT). Time domain samples of an OFDM symbol can be obtained from frequency domain symbols as $$x_n(m) = IFFT\{S_{n,k}\} \qquad (1)$$
$$= \sum_{k=0}^{N-1} S_{n,k} e^{j2\pi mk/N} \quad 0 \le m \le N-1$$

where $S_{n,k}$ is the transmitted data symbol at the kth subcarrier of the nth OFDM symbol and N is the number of subcarriers. After the addition of cyclic prefix and D/A conversion, the signal is passed through the mobile radio channel.

At the receiver, the signal is received along with noise and interference. After synchronization and removal of the cyclic prefix, fast Fourier transform (FFT) is applied to the received signal to return to the frequency-domain. The received signal at the kth subcarrier of nth OFDM symbol can then be written as $$Y_{n,k} = S_{n,k} H_{n,k} + \underbrace{I_{n,k} + W_{n,k}}_{Z_{n,k}} \qquad (2)$$

where $H_{n,k}$ is the value of the channel frequency response (CFR), $I_{n,k}$ is the colored noise (interference), and $W_{n,k}$ is the white Gaussian noise samples. It is assumed that the impairments due to imperfect synchronization, transceiver non-linearities etc. are folded into $W_{n,k}$ and the CFR is not changing within the observation time.

The white, Gaussian noise is modeled as $$W_{n,k} = N(0, \sigma_0^2)$$

and the interference term as $$I_{n,k} = N(0, \sigma_{n,k}^2)$$

where $\sigma_{n,k}$ is the local standard deviation. Note that although the time-domain samples of the interference signal are correlated (colored), the frequency-domain samples ($I_{n,k}$) are not correlated, but their variances are correlated. Assuming that the interference and white noise terms are uncorrelated, the overall noise term $Z_{n,k}$ can be modeled as $$Z_{n,k} = N(0, \sigma_{n,k}'^2)$$

where $$\sigma_{n,k}'^2 = \sigma_{n,k}^2 + \sigma_0^2$$

is the effective noise variance. Thus there is provided an estimate of $$\sigma_{n,k}'^2$$

which can be use to find SNR. Note that if $\sigma_0 \gg \sigma_{n,k}$, the overall noise can be assumed to be white and it is colored otherwise.

The commonly used approach for noise power estimation in OFDM systems is based on finding the difference between the noisy received sample in frequency domain and the best hypothesis of the noiseless received sample. It can be formulated as $$Z_{n,k} = Y_{n,k} - \hat{S}_{n,k} \hat{H}_{n,k} \qquad (3)$$

where $\hat{S}_{n,k}$ is the noiseless sample of the received symbol and $\hat{H}_{n,k}$ is the channel estimate for the kth sub-carrier of nth OFDM symbol.

Three different scenarios for the noise process $Z_{n,k}$ can be considered: white noise, stationary colored noise and nonstationary colored noise. The first one is the commonly assumed case, where the frequency spectrum of the noise is uniform. In the second scenario, a strong interferer is assumed which has larger bandwidth than the desired OFDM signal. A strong co-channel interferer is a good example for this case. In the third one, an interferer whose statistics are not stationary with respect to time and/or frequency is assumed to be present. Adjacent channel interference or a co-channel interference with smaller bandwidth than the desired signal are examples of this type of interference. A scenario where the interference is not stationary both in time and in frequency is illustrated in FIG. 1. Here, the statistics of noise components change as we move along the time or the frequency axis.

The present invention proposes the use of a two dimensional sliding window for obtaining the noise plus interference power. Windowing will remove the common assumption of having the noise to be white and it will take colored interference (both in time and in frequency) into account. In this case, the estimate of the noise power at kth subcarrier of nth OFDM symbol can be written as:

$$\hat{\sigma}_{n,k}^2 = \frac{1}{L_t L_f} \sum_{l=n-L_t/2}^{n+L_t/2+1} \sum_{u=k-L_f/2}^{k+L_f/2+1} |Z_{l,u}|^2 \qquad (4)$$

where $L_t$ and $L_f$ are the averaging window lengths in time and frequency respectively.

The sliding window approach given in (4) requires appropriate $L_t$ and $L_f$ values for accurate estimation of noise plus interference power. If the window size is not chosen properly, it degrades the performance of estimation. Estimation error at the kth subcarrier of nth OFDM symbol can be written as:

$$E(n, k) = \hat{\sigma}_{n,k}^2 - \sigma_{n,k}'^2 \tag{5}$$

$$= \frac{1}{L_t L_f} \sum_{l=n-L_t/2}^{n+L_t/2-1} \sum_{u=k-L_f/2}^{k+L_f/2-1} |Z_{l,u}|^2 - \sigma_{n,k}'^2.$$

Note that the instantaneous errors, (5), will be a function of the window size, how correlated the interference is within the averaging window, average interference power and average noise power. Hence, the optimum values for window sizes will be different for each subcarrier and OFDM symbol, i.e. $L_{t,opt}=L_t(n, k)$ and $L_{f,opt}=L_f(n, k)$. One method for choosing the window dimensions would be to minimize expected value of (5).

A suboptimal algorithm that uses the same window sizes for each subcarrier is developed and it is later used to develop the optimum algorithm which calculates the window sizes for each local point.

When the interference is stationary (with respect to time or frequency) it is proposed to use a window with fixed dimensions for estimating the total noise power. Although the fixed window size algorithm is sub-optimum, it is computationally simpler than the optimum method that will be discussed in the next section.

The window dimensions can be calculated by minimizing the mean-squared-error (MSE), i.e by minimizing the expected value of the square of (5). In this case, the MSE can be formulated as:

$$MSE = \varepsilon_{n,k}\{E(n, k)\} \tag{6}$$

$$= \varepsilon_{n,k}\left\{\left[\frac{1}{L_t L_f} \sum_{l=n-L_t/2}^{n+L_t/2-1} \sum_{u=k-L_f/2}^{k+L_f/2-1} |Z_{l,u}|^2 - \sigma_{n,k}'^2\right]^2\right\}$$

where $\epsilon_{n,k}$ is expectation over subcarriers and OFDM symbols. By further simplification, (6) can be written in terms of the auto-correlation of the variance of the noise component $R_{\sigma'2}(\tau, \Delta)$ and the window dimensions ($L_t$ and $L_f$) as shown:

$$MSE = \left(1 + \frac{1}{L_t L_f}\right) R_{\sigma'2}(0, 0) - \frac{2}{L_t L_f} \sum_{l=-L_t/2}^{L_t/2-1} \sum_{u=-L_f/2}^{L_f/2-1} R_{\sigma'2}(l, u) + \tag{7}$$

$$\frac{1}{L_t^2 L_f^2} \sum_{l=-L_t}^{L_t-1} \sum_{u=-L_f}^{L_f-1} (L_t - |l|)(L_f - |u|) R_{\sigma'2}(l, u).$$

Minimizing (7) achieves a trade-off between large window sizes (for white noise dominated cases) and small window sizes (for colored noise dominated cases). The window size that minimizes the MSE should be chosen by averaging, i.e.

$$L_{t,fixed} = \underset{L_t}{\operatorname{argmin}} MSE, \quad L_{f,fixed} = \underset{L_f}{\operatorname{argmin}} MSE. \tag{8}$$

Note that the window size depends on the statistics of interference and white noise. These statistics can be obtained by averaging since the processes are assumed to be stationary.

Figure 2:
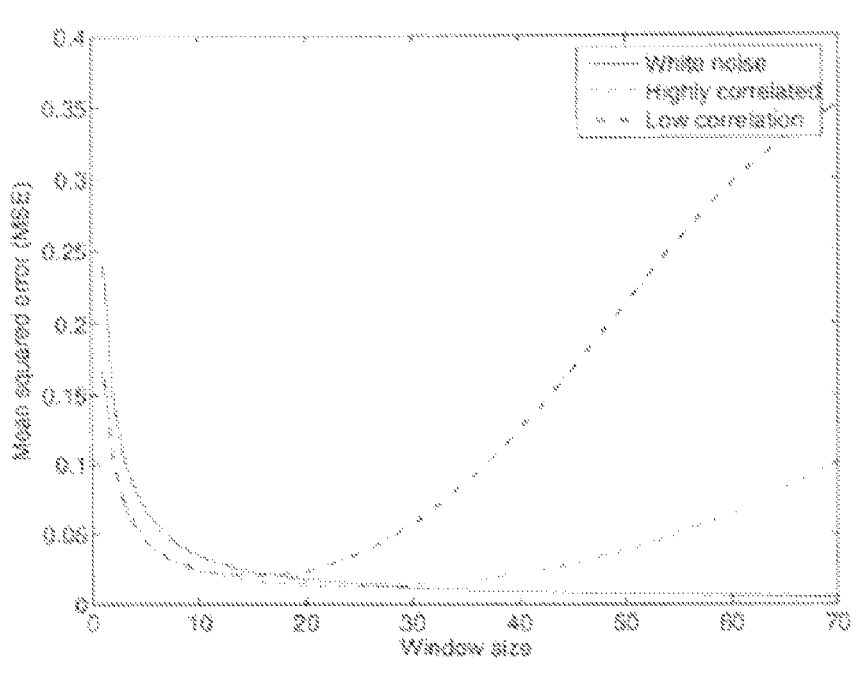
FIG. 2 is a graph showing the mean squared error as a function of window dimension in frequency.

FIG. 2 shows the MSE for different interference scenarios as a function of averaging size. In this figure, only windowing in the frequency domain is considered for simplicity although the same concept is true for windowing in the time domain. The best averaging window size becomes infinity for the white noise case and it has different values depending on the auto-correlation of the power of the total noise. As can be seen from FIG. 2, the averaging size that gives the minimum error decreases as the correlation decreases.

By using a fixed sliding window, the common assumption of having the noise to be white is removed and the colored interference (both in time and in frequency) is taken into account. However, the noise statistics are assumed to be constant, i.e. $R_{\sigma'2}(\tau, \Delta)$ is not changing over the estimation period.

In the previous section, a fixed window size is used over the whole subcarrier index as well as across OFDM symbols by assuming the noise statistics are constant in frequency and in time. This assumption is not valid when the interference is not stationary with respect to time (e.g. 802.11 interference) or with respect to frequency (e.g. narrowband interference) or both. When the dominant interference statistics change over time and/or frequency, the algorithm proposed in the previous section will degrade. In this section, it is proposed to use different window dimensions for each subcarrier. This is achieved by assuming that the interference within the neighborhood of a subcarrier is stationary, i.e. the interference is quasi-stationary with respect to time and frequency.

In order to be able to find the optimum window dimensions for each local point, we replace the correlation term in (7) with local correlation estimate $\hat{R}_{\sigma'2}$. The correlation estimate, $\hat{R}_{\sigma'2}$, estimated using only the noise terms $Z_{n,k}$ within the window for which the MSE is calculated.

The optimum window size for each local point is found by minimizing (7). The correlation values are estimated using the noise within the hypothesized window. The optimum window size in a subcarrier may be very large if the noise has flat spectral content. In order to decrease the computational complexity, window dimensions are found by assuming the interference is stationary. Then, window sizes less then or equal to this value are tested. If the obtained result is equal to the maximum value, the maximum window size is increased and the algorithm is repeated.

In an exemplary embodiment, an OFDM system with 1024 subcarriers and 20 MHz bandwidth is considered. The stationary interference is assumed to be caused by a co-channel user transmitting in the same band with the desired user, and a co-channel signal with 10 MHz bandwidth is used to simulate the non-stationary interference. Averaging over 20 OFDM symbols and estimation of $L_f$ only is considered in this embodiment, but the results can be generalized to the two dimensional case as well.

Figure 3:
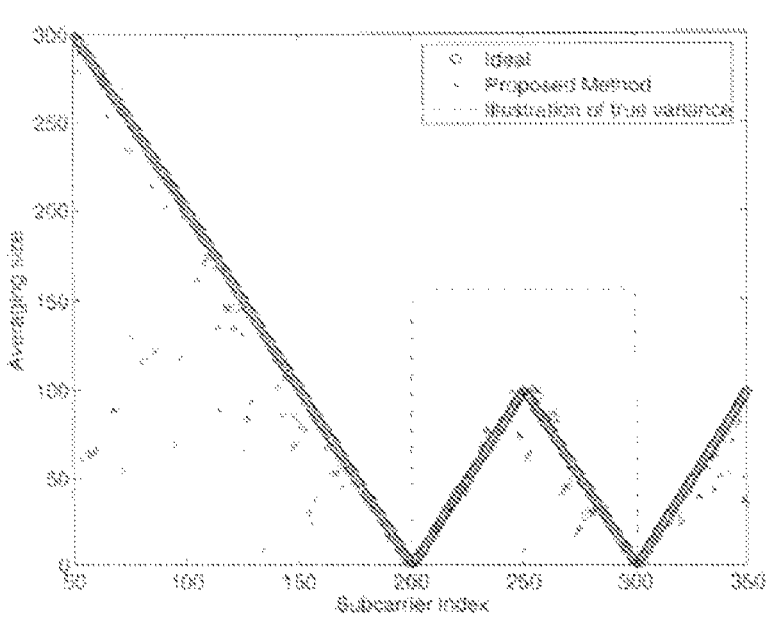
FIG. 3 is a graph showing the averaging size obtained by semi-analytic method and the proposed adaptive window size algorithms.

FIG. 3 shows the window length in the frequency domain for a hypothetical non-stationary interference. Results obtained using the proposed adaptive algorithm and using excessive search are shown. As can be seen, the proposed algorithm finds the correct window dimensions with little error. The error is caused by the absence of enough statistics for obtaining the local correlations. At the edges of the interference the optimum window size goes to zero and it becomes larger where the noise variance is constant.

Figure 4:
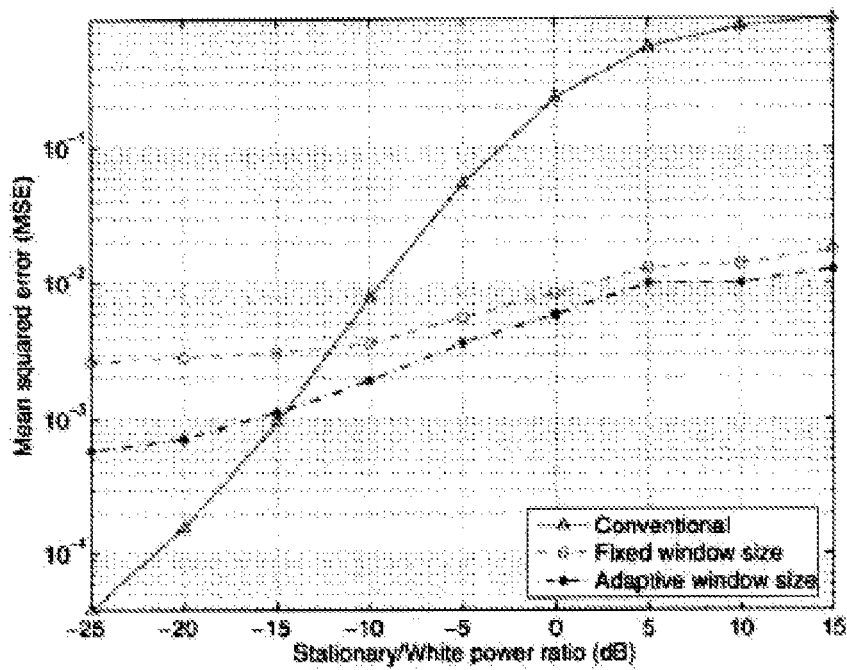
FIG. 4 is a graph showing the mean squared error for different algorithms as a function of the stationary colored noise to white noise power ratios.
Figure 5:
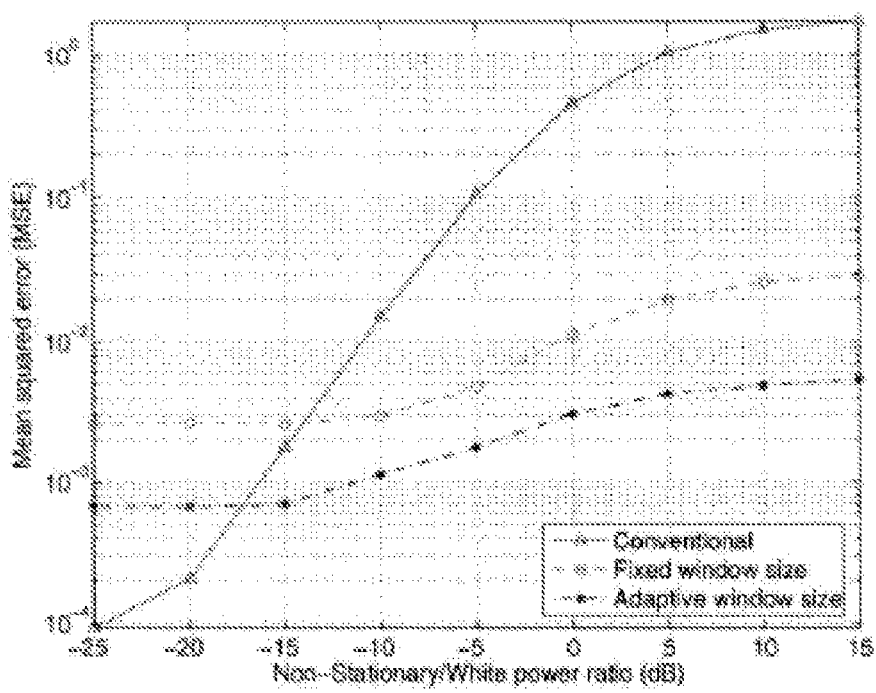
FIG. 5 is a graph showing the mean squared error for different algorithms as a function of the non-stationary colored noise to white noise power ratios.

FIGS. 4 and 5 show the MSEs for the conventional, fixed size window and adaptive window size algorithms. FIG. 4 gives the MSEs as a function of the stationary interference to white noise power ratio and FIG. 5 gives the MSE as a function of the non-stationary interference to white noise power ratio. The total noise plus interference power is kept constant for both figures. Note that when the ratio is very small (e.g. −25 dB), the total noise can be considered as white noise only, and conventional algorithm performs best because its inherent white noise assumption is true. The estimation error increases as the total noise becomes more colored for all three methods. As noise becomes more colored, the averaging window dimensions become smaller for both fixed and adaptive algorithms increasing the estimation error. For conventional algorithm, the increase in the MSE is expected as variation of the noise power is more.

When the interference is stationary, the performance of the fixed window size algorithm is close to the performance of the adaptive window size algorithm while the performance difference becomes more obvious in the case of non-stationary interference. This is because the stationary assumption in the derivation of the fixed window size algorithm is valid for the stationary interference case (FIG. 4) whereas it is not true for the non-stationary interference (FIG. 5).

In accordance with the present invention, a new noise variance estimation algorithm for OFDM systems is provided, which removes the common assumption of white Gaussian noise and considers colored noise. Noise variance, and hence SNR, is calculated by using a two dimensional sliding window in time and frequency. Windows with fixed and adaptive dimensions are considered. The sliding window dimensions in each subcarrier position are calculated adaptively using the local statistics of noise at that subcarrier, hence considering the non-stationary interference scenarios. Although the adaptive window size based algorithm gives the optimum performance, it is computationally complex. Therefore, the fixed window size algorithm may be used in applications where computational complexity is the limiting factor. Simulation results show that the proposed algorithm outperforms the conventional algorithm under colored noise.

In an additional embodiment, a fixed window size may be used for the whole subcarrier set. This way computational complexity will be reduced.

While the examples illustrated address noise variance estimation, the examples are not intended to be limiting and the same technique can be used for SNR estimation.

In the embodiments presented, a rectangular window is considered for simplicity. However, different windowing shapes may be used for calculating local estimates, including, but not limited to, Gaussian, sine, raised cosine, triangle windows etc.

The developed method in accordance with the present invention is not limited to OFDM systems but can be used in all multi-carrier systems such as MIMO-OFDM, MC-CDMA etc.

The developed windowing approach in accordance with the present invention may be used for detecting the narrowband interference.

The developed method in accordance with the present invention may be used with pilot symbol based SNR estimation algorithms.

In the provided methodology, a new noise variance estimation algorithm for OFDM systems, which removes the common assumption of white Gaussian noise and considers colored noise, is developed. Noise variance, and hence SNR, is calculated by using a two dimensional sliding window in time and frequency.

What is claimed is:

1. A method for estimating a noise variance of a signal received from a multi-carrier transmission channel, the method comprising:
   receiving data to be transmitted on a multi-carrier transmission channel, the data received at a transmitter;
   modulating the data using a plurality of subcarriers to form a transmission signal having a plurality of transmission parameters and transmitting the signal using the transmitter;
   receiving the transmitted signal at a receiver, the signal including noise and interference resulting from transmission over the channel; and
   estimating the noise variance of the received signal at each subcarrier using a two-dimensional sliding window in time and frequency, wherein estimating of the noise variance at each subcarrier includes the noise variance at the subcarrier and a correlation of the noise variance across a plurality of subcarriers identified in the sliding window, and wherein a mean-square-error technique has been used to calculate size of the window.

2. The method of claim 1, further comprising filtering the noise variance estimated at each subcarrier to recover the transmitted signal.

3. The method of claim 1, wherein the multi-carrier system is an OFDM system.

4. The method of claim 1, wherein the dimensions of the two-dimensional sliding window are fixed over the plurality of subcarriers.

5. The method of claim 1, wherein the dimensions of the two-dimensional sliding window are adaptive over the plurality of subcarriers.

6. The method of claim 1, wherein the shape of the sliding window is selected from the shapes consisting of rectangular, Gaussian, sine, raised cosine and triangle.

7. The method of claim 4, wherein the fixed dimensions of the two-dimensional sliding window are calculated by minimizing the mean-squared-error using the average noise over the plurality of subcarriers.

8. The method of claim 5, wherein the adaptive dimensions of the two-dimensional sliding window are calculated by minimizing the mean-squared-error using the noise at each of the plurality of subcarriers within the sliding window.

9. The method of claim 1, further comprising using the estimated noise variance at each subcarrier to detect a narrowband interference of the channel.

10. The method of claim 1, further comprising using the estimated noise variance and a pilot symbol to estimate the signal-to-noise ratio (SNR) for the channel.

11. A system for estimating a noise variance of a signal received from a multi-carrier transmission channel, the system comprising:
   a transmitter for receiving data to be transmitted on a multi-carrier transmission channel, for modulating the data using a plurality of subcarriers to form a transmission signal having a plurality of transmission parameters and for transmitting the signal using the transmitter;
   a receiver for receiving the transmitted signal, the signal including noise and interference resulting from transmission over the channel, and a circuitry for estimating the noise variance of the received signal at each subcarrier using a two-dimensional sliding window in time and frequency, wherein estimating of the noise variance at each subcarrier includes the noise variance at the subcarrier and a correlation of the noise variance across a plurality of subcarriers identified in the sliding window, and wherein a mean-square-error technique has been used to calculate size of the window.

12. The system of claim 11, the receiver further comprising circuitry for filtering the noise variance estimated at each subcarrier to recover the transmitted signal.

13. The system of claim 11, wherein the multi-carrier system is an OFDM system.

14. The system of claim 11, wherein the dimensions of the two-dimensional sliding window are fixed over the plurality of subcarriers.

15. The system of claim 11, wherein the dimensions of the two-dimensional sliding window are adaptive over the plurality of subcarriers.

16. The system of claim 11, wherein the shape of the sliding window is selected from the shapes consisting of rectangular, Gaussian, sine, raised cosine and triangle.

17. The system of claim 14, wherein the fixed dimensions of the two-dimensional sliding window are calculated by minimizing the mean-squared-error using the average noise over the plurality of subcarriers.

18. The system of claim 15, wherein the adaptive dimensions of the two-dimensional sliding window are calculated by minimizing the mean-squared-error using the noise at each of the plurality of subcarriers within the sliding window.

19. The system of claim 11, further comprising circuitry for using the estimated noise variance at each subcarrier to detect a narrowband interference of the channel.

20. The system of claim 11, further comprising circuitry for using the estimated noise variance and a pilot symbol to estimate the signal-to-noise ratio (SNR) for the channel.

* * * * *